United States Patent
Nation et al.

(10) Patent No.: US 7,301,906 B2
(45) Date of Patent: Nov. 27, 2007

(54) METHODS AND STRUCTURES FOR IMPROVED BUFFER MANAGEMENT AND DYNAMIC ADAPTION OF FLOW CONTROL STATUS IN HIGH-SPEED COMMUNICATION NETWORKS

(75) Inventors: George Wayne Nation, Eyota, MN (US); Gurumani Senthil, San Jose, CA (US); Gary Scott Delp, Rochester, MN (US)

(73) Assignee: LSI Corporation, Milpitas, CA (US)

( * ) Notice: Subject to any disclaimer, the term of this patent is extended or adjusted under 35 U.S.C. 154(b) by 1174 days.

(21) Appl. No.: 10/232,051

(22) Filed: Aug. 30, 2002

(65) Prior Publication Data

US 2003/0117958 A1 Jun. 26, 2003

Related U.S. Application Data

(60) Provisional application No. 60/341,339, filed on Dec. 17, 2001.

(51) Int. Cl.
*G06F 11/00* (2006.01)
*H04L 12/28* (2006.01)

(52) U.S. Cl. .................. 370/235; 370/230.1; 370/392; 370/503

(58) Field of Classification Search ........ 370/229–240, 370/395.62, 354, 389, 392, 503, 235, 506
See application file for complete search history.

(56) References Cited

U.S. PATENT DOCUMENTS

| | | | |
|---|---|---|---|
| 4,450,554 A | 5/1984 | Steensma et al. | |
| 4,855,996 A | 8/1989 | Douskalis | |
| 5,007,043 A | 4/1991 | van den Dool et al. | |
| 5,224,092 A | 6/1993 | Brandt | |
| 5,274,644 A | 12/1993 | Berger et al. | |
| 5,276,681 A | 1/1994 | Tobagi et al. | |
| 5,313,467 A | 5/1994 | Varghese et al. | |
| 5,452,115 A | 9/1995 | Tomioka | |
| 5,455,825 A | 10/1995 | Lauer et al. | |
| 5,455,826 A | 10/1995 | Özveren et al. | |
| 5,488,610 A | 1/1996 | Morley | |
| 5,506,844 A | 4/1996 | Rao | |
| 5,541,926 A | 7/1996 | Saito et al. | |

(Continued)

OTHER PUBLICATIONS

"System Packet Interface Level (SPI-5): OC-768 System Interface for Physical and Link Layer Devices" (Gass st al.) Nov. 2001, pp. 1-75.*

(Continued)

*Primary Examiner*—Afsar Qureshi
(74) *Attorney, Agent, or Firm*—Duft, Bornsen & Fishman (57) ABSTRACT

Methods and structure for standardized, high-speed serial communication to reduce memory capacity requirements within receiving elements of a high-speed serial communication channel. In an exemplary SPI compliant embodiment of the invention, the semantic meaning of the STARVING, HUNGRY and SATISFIED flow control states is modified to allow the transmitting and receiving elements to manage buffer storage in a more efficient manner to thereby reduce memory capacity requirements while maintaining the integrity of flow control contracts and commitments. The methods and structure further provide for generation of storage metric information to dynamically update the flow control status information asynchronously with respect to data packet transmissions.

22 Claims, 4 Drawing Sheets

U.S. PATENT DOCUMENTS

| | | |
|---|---|---|
| 5,548,587 A | 8/1996 | Bailey et al. |
| 5,555,244 A | 9/1996 | Gupta et al. |
| 5,557,318 A | 9/1996 | Gabeēl |
| 5,557,611 A | 9/1996 | Cappellari et al. |
| 5,596,576 A | 1/1997 | Milito |
| 5,610,745 A * | 3/1997 | Bennett ............ 398/52 |
| 5,781,624 A | 7/1998 | Mitra et al. |
| 5,799,002 A | 8/1998 | Krishnan |
| 5,996,013 A | 11/1999 | Delp et al. |

OTHER PUBLICATIONS

System Packet Interface Level 5 (SPI-5): OC-768 System Interface for Physical and Link Layer Devices Nov. 2001, pp. 1-75, The Optical Internetworking Forum, Freemont, CA.

System Packet Interface Level 4 (SPI-4) Phase 2: OC-192 System Interface for Physical and Link Layer Devices Jan. 2001, pp. 1-64, The Optical Internetworking Forum, Fremont, CA.

* cited by examiner

METHODS AND STRUCTURES FOR IMPROVED BUFFER MANAGEMENT AND DYNAMIC ADAPTION OF FLOW CONTROL STATUS IN HIGH-SPEED COMMUNICATION NETWORKS

RELATED PATENTS

This patent claims priority to U.S. Provisional Patent Application Ser. No. 60/341,339, filed Dec. 17, 2001, entitled FLOW CONTROL MEANS FOR IMPROVED SHARED STORAGE MANAGEMENT BY DYNAMICALLY ALTERING FLOW CONTROL STATUS and which is hereby incorporated by reference.

BACKGROUND OF THE INVENTION

1. Field of the Invention

The invention relates generally to flow control and buffer management in high-speed communication media and protocols and more specifically relates to improved buffer management and flow control in high-speed, serial communication network media and protocols.

2. Discussion of Related Art

In electronic network communication systems, a transmitting element is in communication with a receiving element for the exchange of information therebetween. In many such electronic networks, the communications medium connecting the transmitting and receiving elements is a serial interface in which bits of information to be communicated are exchanged in a sequential, serial fashion. Sometimes be serial communication interface may be as narrow as a single bit in width while in other high-speed applications, the serial communication may involve multiple bits communicated in parallel as a word and words communicated in a serial sequential fashion.

In many such electronic communication systems, the transmitting element and a receiving element may be implemented as distinct electronic systems such that the transmitting element produces information at a different rate than the receiving element is capable processing. In such cases, it is generally known in the art to use techniques broadly referred to as flow control to assure that the receiving element is not overrun or overflowed by the production and transmission of information from the transmitting element. Generally speaking, flow control involves the receiving element instructing the transmitting element as to the maximum amount of data that may be presently received or otherwise indicating to the transmitting elements that no further data may be received for a period of time.

It is also common in high-speed electronic communication systems that the exchange of information between the transmitting element and a receiving element is "packetized" (i.e., information aggregated into packets). Each packet of information comprises a certain amount of substantive information coupled with associated overhead information to allow verification and acknowledgment of proper receipt of substantive data (i.e., to verify that no data is missing and/or to reconstruct any missing data and to verify that data is received in the proper sequence).

It is also generally known in such networks that both the transmitting element and the receiving element are comprised of various layers of communication components often referred to as a "stack" or "protocol stack." Higher layers of such a protocol stack generally provide interfaces to applications and system programs requiring communication services to exchange information with another device. As the information descends from higher layers of the protocol stack to lower layers of the protocol stack, corresponding packet header information may be appended and prepended to the data received from the higher level to allow for robust, reliable exchange of information with a corresponding layer at the receiving element protocol stack.

At each of such layer of a protocol stack, the element generating information may be viewed as a transmitting element and the next lower layer to which it transmits information may be viewed as a receiving element. Flow control is therefore a standard technique practiced not only between distinct computing or communicating elements of electronic network systems but also as a method practiced between various layers of communication media and protocols within a single transmitting element or receiving element.

In many areas of network communications, industries are becoming more standardized in their definition and application of various layers of such a communications protocol stack. Such enhanced interoperability has enabled more efficient distributed development of communication applications across multiple devices and even across devices from multiple vendors. For example, one industry trade organization, the Optical Interconnect Forum ("OIF"), has been formed to establish specifications and agreements for interconnection of high-speed communication media and protocols. One of the various agreements created and maintained by this trade organization is the system packet interface ("SPI"). The current version of the SPI specification is SPI 5 preceded by SPI 4.2. The SPI 5 interface specifications are generally available from at: http://www.oiforum.com/public/elec_interface.html.

The SPI 4 and SPI 5 specifications both address communication media and protocols for high-speed fiber-optic communication channels. These specifications pertain to high-speed fiber communication media such as OC192 and OC768, respectively. The specifications define a rich set of ports (logical channels) that can be active on the physical link at any given time. The SPI 4 specification allows for up to 256 such ports or logical channels while the SPI 5 specification provides for a far greater number of ports (i.e., $2^{144}$ ports).

The SPI 4 and SPI 5 specifications are exemplary of communication standards in which flow control is based on a credit structure wherein the receiving end of the link indicates its a readiness to receive further information in accordance with various threshold levels of space available in its buffer memory—i.e., credits for packets that may be received. Under the SPI standards, the credit information is returned from the receiving element to the transmitting element through a two bit wide signal path. Rather than returning explicit credit amounts, the two bit field indicates one of three status conditions. A HUNGRY status indicates that of the receiving element is prepared to his receive additional information from the transmitter. The STARVED status indicates that the receiver is in need of further information to avoid underrun conditions (underrun conditions that may reduce utilization of the bandwidth of the communication channel). A SATISFIED status indicates that the available buffer memory of the receiving element is almost full indicating full utilization of the available communication bandwidth. The memory credit status is returned in regular status updates from the receiving element on a periodic basis.

Under the SPI standards, the transmitting element and receiving element agree on common threshold values that correspond to each of the three credit status values. The agreed upon threshold values are referred to as MAX-BURST1 and MAXBURST2. A table included in the SPI 4 and SPI 5 specification provides the precise semantic definition of each of the three status states as they relate to the predefined threshold values for available buffer memory in the receiving element. In sum, the STARVING status indicates that the receiving element has at least enough memory space for the higher predetermined threshold value (MAX-BURST1). When a receiving port reports the STARVING status, sufficient buffer memory must be available in the receiving element to assure proper receipt and processing of at least MAXBURST1 packets of information. Under the SPI standards, a receiving element (port) may alter the status at a later time if buffer memory is no longer available but may only do so on a periodic basis when regular status updates are reported from the receiving element to the transmitting element. During the latency period between such updates, the receiving element must have this minimum amount of storage preallocated (i.e., MAXBURST1 packets). Further, the buffer management and credit scheme is defined on a port-by-port basis in accordance with the SPI 4 specifications and either port-by-port or pool-by-pool under the SPI 5 specifications. This minimum buffer allocation is therefore multiplied by the number of ports (or pools) presently defined for the receiving device.

It is therefore critical to in such credit-based flow control architectures to accurately determine the MAXBURST1 (and MAXBURST2) threshold values to permit optimal bandwidth utilization of the communication channel while reducing memory utilization within the receiving element. As discussed further herein below, typical cases supporting 256 active channels under the SPI LVTTL (single ended) signaling standards utilized can require as much as 2 MB of buffer storage for this worst-case, but not uncommon, scenario of all ports starving for data. SPI 5 standards extend the number of ports up to $2^{144}$ and therefore correspondingly increase the potential buffer memory required to stand ready to receive bursts of data on all ports.

Similar resource allocation problems may arise in other flow control protocols and standards. Where a minimum buffer space is required for each port of a multiported communication system, the buffer memory requirements may rapidly grow to large, costly capacities.

It is evident from the above discussion that the need exists for an improved architecture in flow control and buffer memory management for high-speed serial communication devices to maintain high-performance while reducing buffer memory requirements.

SUMMARY OF THE INVENTION

The present invention solves of the above and other problems, thereby advancing the state of the useful arts, by providing methods and structure for flow control in high speed serial communication protocols that manage buffer memory allocation utilizing storage metric information associated with the ports to reduce minimum required memory allocation in a communication system design. As applied to the SPI standards, the invention provides for modifications to the semantic interpretation of the flow control status bits as defined by the SPI 4 and SPI 5 specifications and provides buffer storage metrics and associated buffer management techniques to minimize wasted, unused buffer memory.

In particular, the present invention provides a set of storage metrics useful to track the amount of storage being used at the receiving element of a high-speed serial link. The storage metrics include counters specifically defined to track available versus used memory for several categories of storage and to track usage of that storage on a per port (or pool) basis. The storage metric information may be used by the modified flow control logic to algorithmically make decisions as to which ports (or pools) should be reprioritized such that: buffers are not overrun, all traffic progresses, and all flow control contracts and commitments are met.

A first feature of the invention provides a method for transmission flow control in high-speed serial data transmission element comprising the steps of: maintaining an available credits indicia associated with each port of a plurality of ports associated with said transmission element; transmitting packets to an identified port in a receiving element when allowed in accordance with the available credits indicia associated with said identified port; receiving port status information from said receiving element wherein said port status information is associated with said identified port; detecting changes in said port status information wherein detecting of said changes is asynchronous with respect to the step of transmitting; and reducing said available credits indicia associated with said identified port in accordance with the detected changes.

Another aspect of the invention further provides that the transmission element is an SPI compliant transmission element.

Another aspect of the invention further provides that the step of detecting a reduction in available buffer space for said identified port comprises detecting a change in the xSTAT[1:0] field from STARVING status to HUNGRY status, and that the step of reducing available credits comprises the step of setting said available credits associated with said identified port to the lesser of the present value of said available credits and the MAXBURST2 parameter associated with said identified port.

Another aspect of the invention further provides that the transmission element is an SPI compliant transmission element, and that the step of detecting a reduction in available buffer space for said identified port comprises detecting a change in the xSTAT[1:0] field from STARVING status to SATISFIED status, and that the step of reducing available credits comprises the step of setting said available credits associated with said identified port to zero.

Another feature of the invention provides a method for reception flow control a high-speed serial data receiving element comprising the steps of: generating storage metric information regarding buffer memory associated with each port of multiple ports associated with said receiving element; and transmitting updated port status information to a transmitting element associated with said port wherein said updated port status information is derived from said storage metric information.

Another aspect of the invention further provides for allocating dedicated buffer memory associated with said each port; and allocating shared buffer memory common to all of said multiple ports.

Another aspect of the invention further provides that the step of generating comprises the step of: counting the amount of said dedicated buffer memory used by said each port.

Another aspect of the invention further provides that the step of transmitting updated port status information further comprises the step of: updating said updated port status information in accordance with the present count of said amount of dedicated buffer memory used by said each port.

Another aspect of the invention further provides that the step of generating comprises the step of: counting the amount of said shared buffer memory used by said each port.

Another aspect of the invention further provides that the step of transmitting updated port status information further comprises the step of: updating said updated port status information in accordance with the present count of said amount of shared buffer memory used by said each port.

Another aspect of the invention further provides that the step of generating comprises the steps of: counting the amount of said shared buffer memory used by said each port; and counting the amount of said dedicated buffer memory used by said each port.

Another aspect of the invention further provides that the step of transmitting updated port status information further comprises the step of: updating said updated port status information in accordance with the present count of said amount of dedicated buffer memory used by said each port and in accordance with the present count of said amount of shared buffer memory used by said each port.

Another aspect of the invention further provides that the receiving element is an SPI compliant receiving element.

Another aspect of the invention further provides that the step of updating comprises the step of: updating said port status information to a status value selected from the group consisting of SATISFIED, HUNGRY, and STARVED in accordance with the present count of said amount of dedicated buffer memory used by said each port and in accordance with the present count of said amount of shared buffer memory used by said each port.

Another feature of the invention provides a method in an SPI compliant serial communication system having a transmission element and a receiving element, the method comprising: generating buffer memory storage metric information within said receiving element wherein said storage metric information indicates buffer memory utilization by each port of a plurality of ports; generating, within said receiving element, port status information regarding said each port wherein said port status information includes flow control information; transmitting said port status information to said transmission element wherein said port status information is transmitted as xSTAT[1:0] status fields for said each port; and transmitting packets from said transmission element to said receiving element when permitted in accordance with said flow control information, wherein said port status information is updated and transmitted to said transmission element asynchronously with respect to the transmission of said packets.

Another aspect of the present invention further provides for the step of: allocating dedicated buffer memory associated with said each port; and allocating shared buffer memory common to all of said multiple ports.

Another aspect of the present invention further provides that the step of generating said buffer memory storage metric information comprises the steps of: counting the amount of said shared buffer memory used by said each port; and counting the amount of said dedicated buffer memory used by said each port.

Another aspect of the invention further provides that the step of transmitting said port status information further comprises the step of: updating said port status information in accordance with the present count of said amount of dedicated buffer memory used by said each port and in accordance with the present count of said amount of shared buffer memory used by said each port.

Another aspect of the invention further provides that the step of updating comprises the step of: updating said port status information as an xSTAT[1:0] status value selected from the group consisting of SATISFIED, HUNGRY, and STARVED in accordance with the present count of said amount of dedicated buffer memory used by said each port and in accordance with the present count of said amount of shared buffer memory used by said each port.

Another aspect of the present invention further provides that the step of transmitting packets further comprises the steps of: detecting, within said transmission element, a change in said port status information from STARVING status to HUNGRY status, and setting an available credits associated with said identified port to the lesser of the present value of said available credits and the MAX-BURST2 parameter associated with said identified port.

Another aspect of the invention further provides that the step of transmitting packets further comprises the steps of: detecting, within said transmission element, a change in said port status information from STARVING status to SATISFIED status, and setting an available credits associated with said identified port to zero.

Another feature of the present invention provides a method in a communication system including a transmitting element coupled to receiving element having multiple ports, the method operable within said transmitting element comprising the steps of: maintaining an available credit count for each port of said multiple ports wherein said available credit count indicates a number of packets that may be transmitted to said each port; and reducing said available credit count for a first port in response to packet transmissions to other ports of said multiple ports.

DETAILED DESCRIPTION OF THE PREFERRED EMBODIMENTS

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
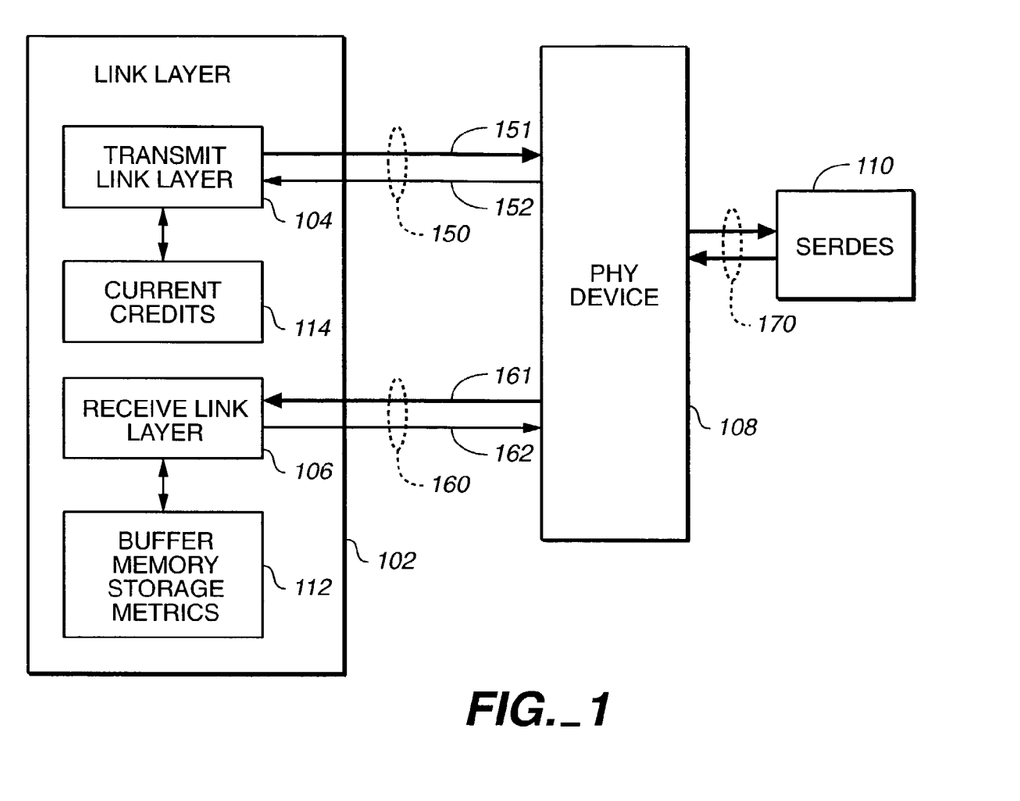
FIG. 1 is a block diagram of a system including structures for improved flow control in accordance with the present invention.

FIG. 1 shows a high-speed serial communication element including both a transmission component 104 within link layer 102 and a receiving element 106 within link layer 102. In accordance with well-known layered network protocol paradigms ("stacks"), link layer 102 provides a level of communications control to coordinate issues such as flow control when communicating with lower layer elements.

PHY device 108 represents such a next lower layer in a layered protocol stack model to perform appropriate processing for physical communication of link layer supplied information over a particular communication medium. Lastly, as shown in FIG. 1, SERDES element 110 provides a next lower layer of communications in which data signals are modulated onto a specific serial communication medium and demodulated from the serial communication medium (i.e., SERialized and DESerialized).

Transmissions from link layer 102 are originated by transmit link layer 104 and the data thereby generated is applied to transmission data path 151 for transmission to PHY device 108. Flow control and other status information is returned on transmission flow control signal path 152. Signal paths 151 and 152, in combination, represents a transmit interface or transmit channel 150. In like manner, information received from PHY device 108 is applied to path 161 for reception and further processing by receiving link layer 106 of link layer 102. In like manner, receive link layer 106 applies flow control and other status signal information to path 162 for return to PHY device 108. Paths 161 and 162, in combination, represents a receive interface or receive channel 160.

Those of ordinary skill in the art will recognize that the general configuration and topology of FIG. 1 may represent any of numerous layered communication structures and protocols. In particular, FIG. 1 is suggestive of at least the SPI (System Packet Interface) defined by the Optical Interconnect Forum (OIF). In particular, SPI 4.2 and SPI 5 both define communications standards generally compatible with the elements thus far described in FIG. 1. Those of ordinary skill in the art will readily recognize that the structures and features of the present invention may be utilized in conjunction with numerous other commercially available and custom, application-specific communication structures and protocols.

The SPI standards (SPI 4.2 and SPI 5 in particular) defined a "port" as a logical channel of communication between communicating link layers of a system. Link layer 102 may therefore represent link layer protocol management for each of multiple such ports defined within a communicating element such as one compliant with the SPI 4 and SPI 5 specifications as well as other well-known, commercially available communication systems or custom, application-specific communication links.

SPI 5 specifications further define a concept of "pool" which represents a logical aggregation of one or more ports. Flow control information as defined by the SPI 5 specifications are applied on a pool-by-pool basis similarly to the flow control information as defined by the SPI 4.2 specifications and may be applied on a port-by-port basis as defined by the SPI 4.2 specification. The features of the present invention are therefore equally applicable under either SPI standard (as well as other communications applications) on both ports and pools. For simplicity of the description herein, the term "port" is to be understood as representing ports as defined by SPI 4 and SPI 5 standards as well as pools as defined by SPI 5 standards. Further, "port" is to be understood more broadly as including communication channels associated with numerous multiported, serial communication systems and protocols. As used herein, "SPI compliant" means devices or methods operable in a manner that is compliant with either or both of the SPI 4.2 and SPI 5 standards.

In accordance with the present invention, transmit link layer 104 may maintain current credit information 114 associated with each potential port of the communication link. Current credit information 114 is used by transmit link layer 104 for purposes of improved flow control in accordance with methods of the present invention discussed further herein below.

Further, in accordance with the present invention, receive link layer 106 generates, maintains, and utilizes buffer memory storage metric information 112 associated with each potential port of the communication link. Receive link layer 106 utilizes such storage metric information, generated and maintained in accordance with the present invention, for purposes of improved flow control further in accordance with the present invention. Methods associated with generation and maintenance of such storage metric information and associated with utilization of such storage metric information for improved flow control are discussed further herein below.

Figure 2:
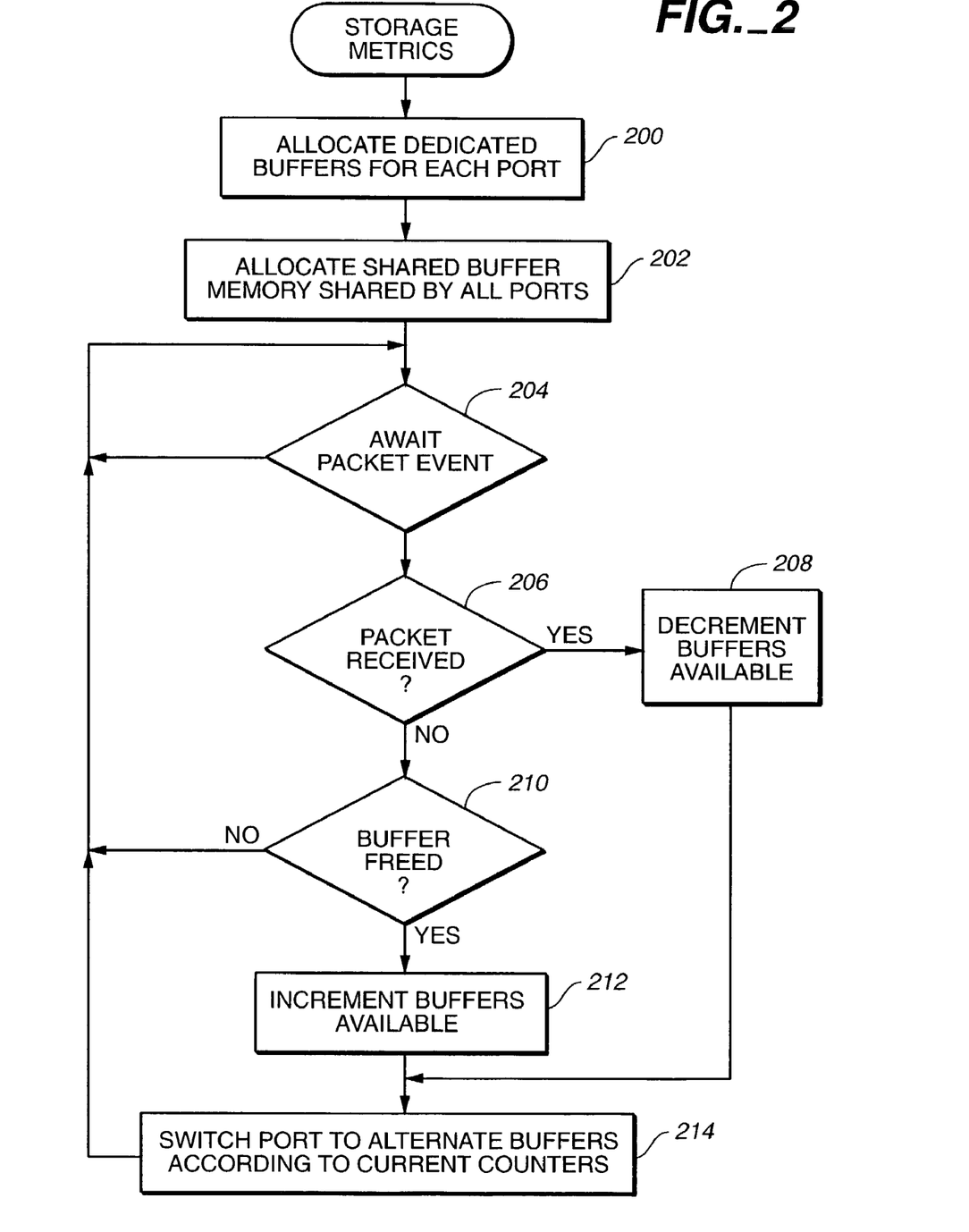
FIG. 2 is a flowchart describing a method of the present invention for maintaining storage metric information useful in improved flow control in accordance with the present invention.

FIG. 2 is a flowchart describing the operation of a method of the present invention operable to gather and maintain storage metric information useful for improved flow control further in accordance with the present invention. As noted above, the receive component of the link layer provides periodic updates to the transmit layer of a communicating device to indicate its level of readiness for receiving transmitted packets of data. Further as noted above, present known protocols may impose a significant burden on a communicating device in that substantial memory allocation may be required to assure robust, reliable transmission of data packets at the full specified bandwidth. Specifically, in accordance with present practices, a receiving element needs to allocate buffer memory associated with the each port of the receiving link layer sufficient to accommodate a maximum length burst of packets. Although a receiving element may update its flow control status information transmitted to a corresponding transmitting element, there exists a latency in the periodic update of such flow control information as well as transmission delays in communicating such updated flow control information from a receiving element to a transmitting element. In light of such latency periods, present practices allocate sufficient memory to each port of the receiving device to allow for a worst-case maximum burst of packets from the transmitting element.

In accordance with the method of FIG. 2, buffer memory may be allocated in at least two classes, including dedicated buffer memory allocated in a manner dedicated to each potential port of the receiving element (as presently known in the art) and shared buffer memory common to all ports in the receiving element. The receiving element that may therefore utilize dedicated memory in combination with shared memory for each port so as to avoid the need for allocating dedicated memory to each port sufficient to handle a maximum potential burst of packets. Rather, dedicated memory may be first used on a particular port and shared memory may be used when a particular burst of transmitted packets exceeds the capacity of dedicated buffer memory allocated to the particular port. Alternatively, shared memory may be the used first for receiving bursts of transmitted packets on a port and then dedicated memory allocated for the port may be used to avoid overflow of the shared memory by the burst transmission.

The method of FIG. 2 therefore initially allocates buffers dedicated to each port and also allocates shared buffer memory shared by all ports. Specifically, element 200 allocates dedicated buffer memory associated with each potential port of the receiving element of the link layer. Element 202 then allocates shared buffer memory shared by all ports. The specific capacity of each of the allocated buffer classes is a matter of design choice well-known to those of ordinary skill in the art. Factors contributing to such capacity determinations may relate to transmission speed, cycle timing for status updates returned from the receiving element to a corresponding transmitting element, the nature of the specific data exchanged over particular ports, and/or other factors well-known to those of ordinary skill in the art.

Having so allocated dedicated buffer memory to be utilized by each port and shared memory to be shared by all ports, element 204 then awaits receipt of a packet related event. As used herein, a packet related event is an event detected by the receiving element of the link layer that may alter the available buffer account. Such events may include, for example, receipt of a packet from a corresponding transmission element on a particular port, consumption of data in a previously received packet thereby freeing the buffer memory for additional packet reception, and potentially other events relating to configuration or allocation of the buffer memory.

Upon receipt of such a packet related event as detected by element 204, element 206 next determines whether the detected event is a packet received event. If so, element 208 is next operable to decrement a count of available buffer space associated with the port on which the packet was received. The count decremented will also correspond to the particular buffer memory used for storing the received packet (i.e., dedicated buffer memory of the port or shared buffer memory). Processing then continues with element 204 to update buffer allocation and flow control information appropriately in response to the packet received event processing. If element 206 determines that the detected event was not a packet received event, element 210 is next operable to determine whether the detected event is a buffer free event representing the freeing of a buffer previously allocated to receive a packet. If not, processing continues by looping back to element 204 to await detection of a next packet event. Those of ordinary skill in the art will recognize that other events may be processed in accordance with the present invention relating to other configuration changes to the buffer allocation or flow control information. If element 210 determines that the detected event was a buffer free event, element 212 is next operable to increment appropriate counters indicative of the availability of another buffer. As above, the counter incremented may be determined in accordance with the port involved and the class of allocated memory (i.e., shared or dedicated). Element 214 is then operable as noted above to update buffer allocation and flow control information appropriately in response to the buffer free event processing. The method then continues by looping back to element 204 to await detection of a next packet related event.

Elements 208 and 212 are described as broadly operable to increment and decrement appropriate counters representing the metric information useful for adapting the received element of flow control information. As noted above, the present invention may preferably allocate multiple classes of buffer memory to be used by each port in receiving packets from a corresponding transmission element. Numerous counters relevant to management of such storage allocations and corresponding flow control will be readily apparent to those of ordinary skill in the art. Exemplary of such counters are a counter indicating usage of preallocated, dedicated storage per port, a counter indicating usage of shared buffer memory per port, a counter of overall remaining available shared storage, etc. These exemplary counters are useful both for proper management of the various classes of allocated memory and, as described further herein below, useful for improved receive flow control information update.

Element 208 therefore represents processing appropriate for decrementing and/or incrementing an appropriate counter or counters to indicate reception of another packet from a transmission element corresponding to the particular port. If the received packet is stored in buffer memory dedicated to the specific port, element 208 may therefore represent processing to increment a counter representing usage of preallocated, dedicated storage per port. If the received packet is stored in shared buffer memory, element 208 may therefore represent processing to increment a counter representing usage of shared storage per port and also decrementing a second counter representing available shared storage. Conversely, element 212 represents processing to increment or decrement appropriate counters indicating freeing of a previously allocated buffer either allocated as dedicated memory associated with the port or allocated from shared memory for temporary use by a particular port. Those of ordinary skill in the art will recognize a wide variety of such counters that may be used for representing current allocation and usage of buffer memory on a per port basis as well as globally by all ports associated with the receiving element of the link layer.

Figure 3:
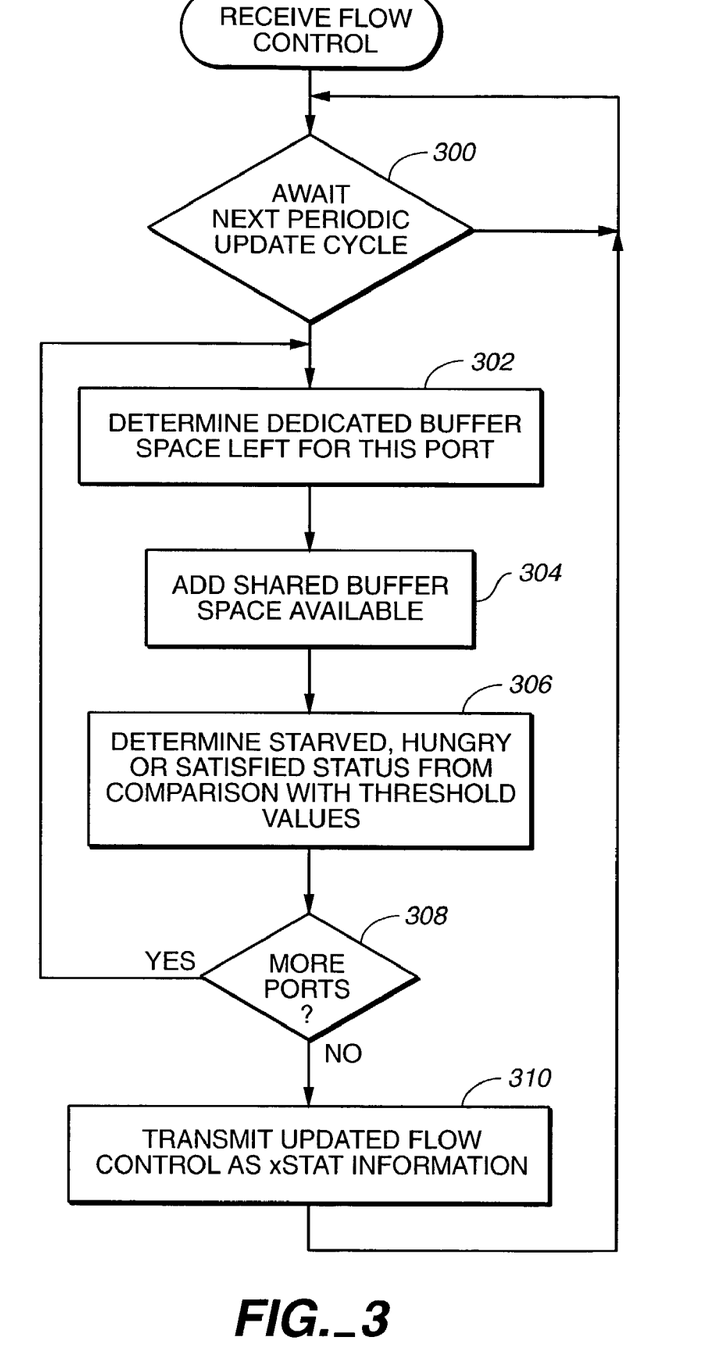
FIG. 3 is a flowchart describing improved flow control techniques operable within a receiving element of a high-speed serial link in accordance with the present invention.

FIG. 3 is a flowchart describing a method of the present invention for improved receive flow control based on storage metric information gathered and maintained as described above with respect to FIG. 2. In general, a receiving element of a link layer transmits flow control information to a transmitting element to indicate its readiness for receipt of further packet data. In particular, in an exemplary SPI compliant embodiment of the present invention, a receiving link layer generates XSTAT information on a periodic basis and returns the generated information to transmission elements associated with particular ports. The SPI port status information includes flow control information represented as one of three states: SATISFIED, HUNGRY and STARVED. In general, in accordance with the SPI specifications, a SATISFIED flow control status indicates that the receiving element has sufficient buffered data such that the transmitting element should not transmit any further packets of information. A HUNGRY flow control status indicates that while the receiving element has some buffered data, additional data may be transmitted by the transmitting element to maintain full bandwidth utilization of the commutation link. Lastly, a STARVING status indicates that the receiving element needs additional information as soon as possible to avoid potential underflow (underutilization) of the available commutation link bandwidth.

More generally, the SPI standards are exemplary of a communication system architecture wherein flow control is determined in accordance with buffer credit information and where buffer space is associated with each port of a multi-ported communication system of receivers and transmitters. Flow control in such architectures is generally encoded as a function of remaining available buffer space (credits). Credits are generally updated by the receiving element in response to receipt of transmitted packets from a transmitting element. The updated credit information is then forwarded from the receiving element to the transmitting element(s) in accordance with rules of the particular protocol. As noted, in accordance with the SPI standards, credit information is communicated as one of three status indicators, namely STARVING, HUNGRY or SATISFIED. More generally, credit-based flow control schemes encode the credit information in some form for information exchange between the receiving element and the transmitting element(s).

In accordance with the improved flow control of the present invention, the method of FIG. 3 determines flow control status of the receive link layer with reference to the storage metric information gathered and maintained as described above with respect to FIG. 2 for all classes of storage usable by each particular port. As noted above, in the SPI specifications, a receiving element periodically transmits updated port status information to associated transmitting elements. Element 300 represents the processing to await start of a next periodic update cycle wherein the receiving link layer element transmits updated port status information to transmitting elements for each port. The updated port status information includes updated flow control information for each port. When the next periodic update cycle has been detected, elements 302 through 308 are iteratively operable to generate updated port status information (including flow control information) for each of multiple ports known to the receive link layer element. Element 302 is operable to determine the amount of dedicated buffer memory space available for the next (or first) port associated with the receive link layer relevant. Element 304 is then operable to add the presently available shared buffer memory space to the dedicated buffer memory space for the port. Element 308 then determines the present flow control status of the port based on comparison of the available buffer memory indicated by elements 302 and 304. The flow control status is thereby determined as STARVED, HUNGRY or SATISFIED in accordance with an SPI compliant embodiment of the present invention. Element 308 then determines if more ports remain to be analyzed for purposes of updating port status and flow control information. If so, processing continues by looping back to element 302 to determine port status and flow control information for a next port known to the receive link layer element. When element 308 determines that no further ports need be processed, element 310 is next operable to transmit the updated flow control information as a vector of data. The transmission is directed to corresponding transmitting elements for each port presently known to the receive link layer element.

In general, the method described in FIG. 3 allows the receive link layer element to "advertise" packet storage capacity available for each port despite the fact that the capacity is not represented as dedicated buffer memory space associated exclusively with that port. Rather, the "advertised" space as indicated by flow control information for each of the various ports represents an aggregated buffer memory capacity based on a combination of dedicated buffer memory per port and shared buffer memory shared by all ports known to the receive link layer element. In accordance with the present invention this "false advertising" is safe in that it cannot lead to deadlock or packet loss as between the transmitting and receiving elements on a port. First, the advertised space can be updated within the time period of one periodic cycle of port status information refresh. Second, during any such single status refresh cycle no more than a fixed amount of packet information may be received distributed over all ports known to the receive link layer element. Although it is not the case that each individual port has sufficient memory dedicated to it to assure reception of a maximum burst of transmitted packets during the refreshed update cycle, the use of dedicated buffer memory combined with shared buffer memory assures that a maximum burst of transmitted packets cannot overrun the aggregated buffer memory in the receive link layer element for any one of the ports.

Other credit-based flow control features of other protocols may similarly apply the features of this method. In general, the method described applies to credit-based flow control where a receiving element informs the transmitting element of available credits in such a manner that the total aggregate buffer space requirements of a receiving element may be reduced. Each port of a multiported device advertises its buffer space as a function of the combination of available memory in all classes—i.e., the combination of available dedicated memory space and some portion of shared buffer memory space.

In one exemplary embodiment of the improved receive flow control, the counter (storage metric) reflecting number of used buffers in shared buffer memory is compared against threshold values. The threshold values are derived as functions of the number of packets that may be received during the port status update latency period. A low threshold value in such a case may be, for example, a buffer count of 2 and a high threshold value in such a case may be, for example, a buffer count of 5. Those skilled in the art will recognize that any appropriate threshold values may be selected as a matter of design choice for a particular application of the invention. The present counter value is then compared against these two threshold values to determine the present flow control state to be assigned. Such a simple comparison may be implemented as a table lookup function as follows:

| Comparison with Low Threshold | Comparison with High Threshold | Flow Control Status Output |
|---|---|---|
| GT | GT | SATISFIED |
| GT | LE | HUNGRY |
| LE | LE | STARVED |

Other storage metrics (i.e., counters) may be used in more complex functions and comparisons to provide a richer test and associated translation to a flow control encoded status value. For example, the computed remaining available dedicated storage for each port may be compared against three threshold values, a low threshold, a medium threshold and a high threshold. Further, as a separate factor, the global availability of all buffer memory space available may be used as another indicator compared against one or more threshold values. Based upon these comparisons, the desired flow control updated information may be determined in accordance with the following table.

| Comparison with Low Threshold | Comparison with Medium Threshold | Comparison with High Threshold | Level of Global Buffer Availability | Flow Control Status Output |
|---|---|---|---|---|
| GT | GT | GT | Don't Care | SATISFIED |
| GT | GT | LE | Limited | SATISFIED |
| GT | GT | LE | Limited | SATISFIED |
| GT | GT | LE | Unlimited | HUNGRY |
| GT | LE | LE | Very Limited | SATISFIED |
| GT | LE | LE | Limited | HUNGRY |
| GT | LE | LE | Unlimited | HUNGRY |
| LE | LE | LE | Very Limited | SATISFIED |
| LE | LE | LE | Limited | HUNGRY |
| LE | LE | LE | Unlimited | STARVED |

Those of ordinary skill in the art will recognize that numerous equivalent computations may be used as a measure to be compared against any number of threshold values. The simple functions described herein as exemplary tables above are but two examples of such functions. Numerous richer computations and comparisons may be performed as a matter of design choice readily apparent to those of ordinary skill in the art. Still further, a shared memory as described above may be segmented into multiple pools of shared memory where each pool is shared by a select subset of ports known to the receive link layer element.

Further, those of ordinary skill in the art will recognize that the flow control status is shown in the above tables encoded as one of three values, namely: STARVED, HUNGRY and SATISFIED. This particular encoding of flow control indicia is suggested by the SPI standards. Those skilled in the art will recognize a variety of equivalent encodings of flow control status information including encodings that utilize a different number of encoded values. Use of the SPI suggested encoding values merely represents one possible embodiment of features of the invention. Numerous equivalent encodings will be readily apparent to those skilled in the art.

Another aspect of the present invention provides for improved use of flow control information within the transmit link layer element. As noted herein above, the transmit link layer element receives flow control information from corresponding receive link layer elements communicating through one or more ports over the communication medium. In particular, in an SPI compliant embodiment of the present invention, flow control information is included in periodic port status information generated and transmitted by corresponding receive link layer elements. Still further as regards an SPI compliant embodiment of the present invention, such flow control information is indicated as one of three states, namely: STARVED, HUNGRY and SATISFIED.

In association with the improved buffer memory allocation and management and the associated receive flow control information described herein above, the transmit link layer element flow control of the present invention is adapted to better utilize the improved flow control information received. In particular, in an SPI compliant embodiment of the present invention, the transmit element response to transitions between the SATISFIED, HUNGRY and STARVING flow control states is modified with respect to the SPI standard definitions. The SPI specifications provide a table structure defining the standard response of the transmit element in response to receipt of each of the three flow control states.

In general, in accordance with the SPI standards, a transmitting element maintains a current credit value for each port indicating a number of packets that may be transmitted on the corresponding port without violating the flow control contracts represented by the flow control information provided by a receiving element with each associated port. In accordance with the SPI standards, a transmitter receiving a STARVED flow control status from a corresponding receive link layer element increases that port's credit value to the higher of two configured threshold values. Specifically, in response to a STARVED status with the transmit element increases its current credit value to the MAXBURST1 preconfigured value. Such a value indicates that the receiving element can receive a maximum size burst of packets before risking any potential loss of information. Further, in accordance with the SPI standards a transmitter receiving a HUNGRY status from a corresponding receive link layer element increases its current credit value to the greater of the current credit value and a second preconfigured value, namely MAXBURST2 (<MAXBURST1). Still further, in accordance with the SPI standards, a transmitter receiving a SATISFIED flow control status does not change its present credit value such that presently available credits remain available.

Another aspect of the present invention involves improved transmit flow control associated with the above discussed receive flow control and buffer memory management. The improved transmit flow control responds differently to received flow control information from receiving elements. More specifically, the improved transmit flow control alters current credits associated with each port in response to received flow control updates so as to assure avoidance of overrun conditions. This improved flow control allows the receiving ports to update their respective flow status values independent of any related packet transmission. Rather, the transmit flow control permits the receive elements to update their respective flow control status values in response to the buffer management and storage metric information gathered and maintained by the receive element.

In an SPI compliant embodiment of the invention, the transmit element flow control responds differently to the HUNGRY and SATISFIED flow control status received from a corresponding receive link layer element. Still more specifically, in response to receipt of a SATISFIED flow control status from a corresponding receive link layer element, the transmit link layer element deletes all remaining credits by setting the present credit value to zero. Such a change coupled with the improved buffer management and corresponding receive flow control discussed above helps avoid potential overrun conditions and aids in the utilization of shared common buffer memory within the receive link layer element. Still further in accordance with the present invention, the transmit element receiving an SPI HUNGRY status from a corresponding receive link layer element alters its present credit value to the lesser of its current credit value and the MAXBURST2 preconfigured value. These changes in the transmit element response to received flow control information correspond to the improvements above in the receive link layer element. In particular, the receive link layer element may alter flow control information asynchronously with respect to the transmission of packets by a transmitting link layer element. In other words, the receive element may update its flow control status even in the absence of packets transmitted to that receiving element. Whereas prior techniques only modified received flow control information for a port in response to receipt of transmitted packets on that port, the present invention permits the received link element to modify its flow control information anytime asynchronously with respect to transmission of packets by a transmitting link layer element. In other words, packets received by other ports in a multiported receive element may affect the shared memory and associated storage metrics in such a manner as to affect other port flow control status information. The receive elements therefore may update their respective flow control status independent of packet transmission to that port. The improvements in the transmit flow control interpretation discussed above therefore enhance the utility of the improved flow control and buffer memory management discussed above with respect to the receive link layer element.

The following table shows the desired modifications to the transmit link layer element response to received flow control information. The table is similar to that shown in the SPI specifications but modifications are highlighted. Only the SATISFIED and HUNGRY flow control states are modified in accordance with the present invention.

| xSTAT[1] | xSTAT[0] | Description |
|---|---|---|
| 1 | 1 | In-band Framing Pattern<br>The framing pattern is sent once per pool status frame in normal operation.<br>This status value is also repeated as part of the training pattern. |
| 1 | 0 | SATISFIED<br>The SATISFIED status indicates that the FIFO of the corresponding sink Pool is almost full. When the SATISFIED status is received, no further credits are granted. Credits granted previously by HUNGRY or STARVING status reports are deleted. |
| 0 | 1 | HUNGRY<br>The HUNGRY status indicates that the FIFO of the corresponding sink Pool is partially empty. When a HUNGRY status is received, the amount of credits at the source Pool is increased to MAXBURST2 blocks if the current value is more than MAXBURST2. If the amount of credit remaining is currently greater than MAXBURST2, due to a previous STARVING status report, the credit count is reduced to MAXBURST2. |
| 0 | 0 | STARVING<br>The STARVING status indicates that the FIFO of the corresponding sink Pool is almost empty. When a STARVING status is received, the amount of credits at the source Pool is set to MAXBURST1 blocks. This status value is also repeated as part of the training pattern. |

Those of ordinary skill in the art will recognize a variety of equivalent modifications to transmit flow control semantic interpretation in accordance with the present invention. Maintenance of a current credit value associated with each port as modified by the enhanced interpretation of the present invention provides for improved bandwidth utilization in a high-speed serial communication channel while allowing the receive link layer element to more effectively manage space constrained buffer memory.

Figure 4:
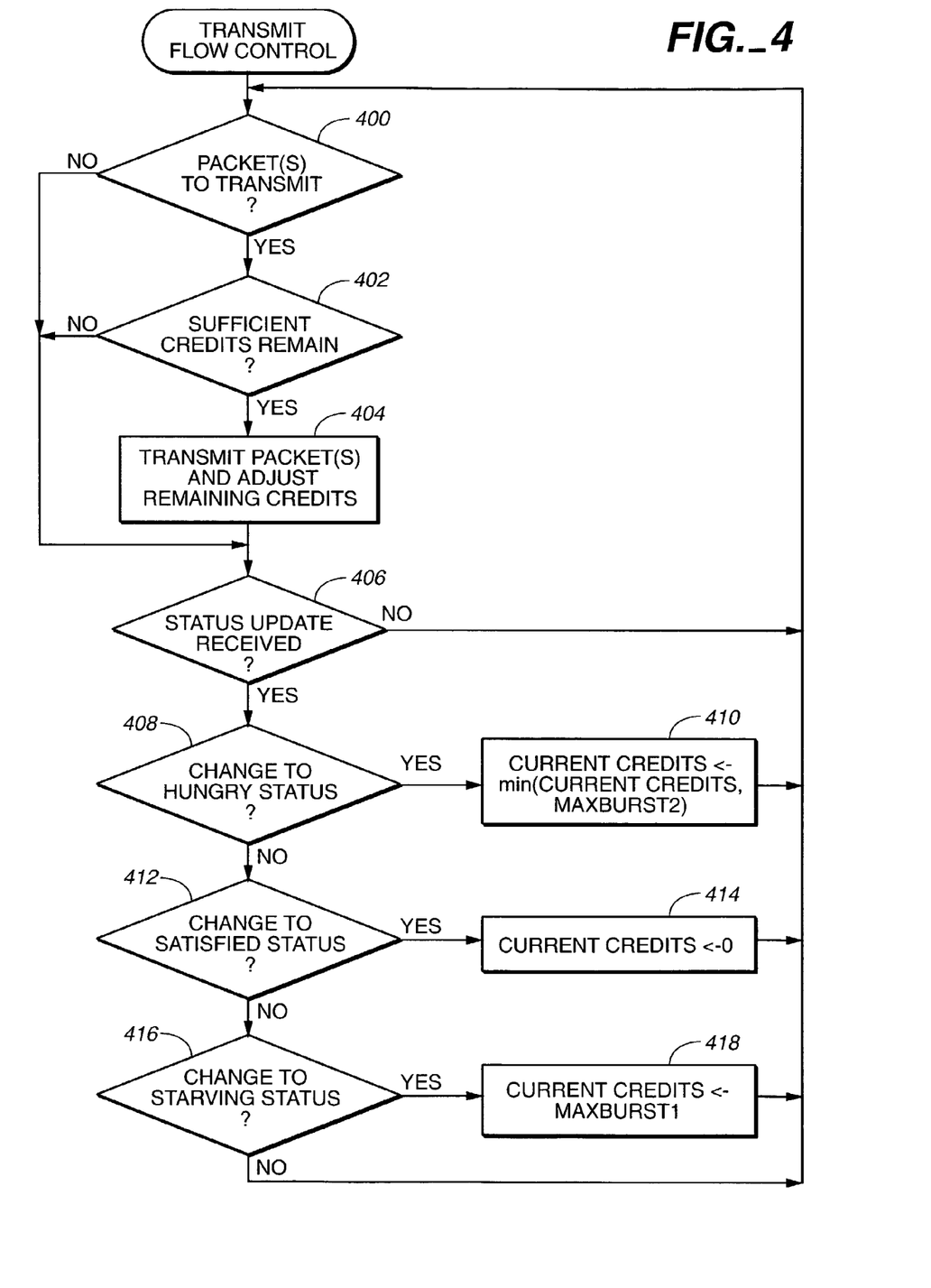
FIG. 4 is a flowchart describing improved flow control techniques operable within a transmitting element of a high-speed serial link in accordance with the present invention.

FIG. 4 is a flowchart describing a method of the present intention for improved utilization of received flow control information within a transmit link layer element. As noted above, one aspect of the present invention provides that the receive link layer element may update its port status information and associated flow control information asynchronously with respect to transmission of packets from a corresponding transmit link layer element (i.e., independent of packets transmitted to that port). Improvements of the transmit flow control therefore better utilize this asynchronously updated flow control information. In particular, the improved transmit flow control allows for reduction of credits associated with an attached receive element in response to updated receive status and independent of packet transmission to that port.

Utilization of flow control information is associated with processing for transmission of packets to a receive link layer element corresponding to a particular port. Element 400 therefore first determines whether any packet or packets are ready for transmission to the associated receive link layer element of the port. If not processing continues with element 406 discussed further herein below. If so, element 402 next determines whether the current credit value indicates that sufficient buffer space remains available with the receive link layer element of the associated port. If insufficient credits remain, processing continues with element 406 discussed further herein below. If sufficient credits remain as indicated by the current credit value maintained by the transmit link layer element, element 404 is next operable to transmit the desired packet or packets and to adjust the current credit value to indicate an appropriate remaining current credit.

Element 406 is then operable to determine if a port status update has been received including updated flow control information from the corresponding receive link layer element. If not, processing continues by looping back to element 400 to check for additional packets to be transmitted. If element 406 determines that a port status information update has been received, element 408 is next operable to determine whether the received flow control status for the port indicates a change to the HUNGRY status. If element 408 detects such a change to the HUNGRY flow control status by the receive link layer element, element 410 is then operable to set the current credit value to the lesser of the present credit value and the MAXBURST2 preconfigured value. This allows for additional packets to be sent in a number not to exceed the preconfigured MAXBURST2 value. Processing then continues by looping back to element 400 as above.

If element 408 determines that the flow control information does not indicate a change to the HUNGRY status, element 412 next determines whether the flow control information indicates a change to the SATISFIED state. If so, element 414 sets the current credit value to zero to preclude further packet transmissions to the associated receive link layer element. Processing then continues by looping back to element 400 as above.

If element 412 determines that the flow control information does not indicate a change to the SATISFIED state, element 416 next determines whether the updated flow control information indicates a change to the STARVED state within the receive link layer element. If not, processing continues by looping back to element 400 as above. If so, element 418 is operable to set the current credit value to the MAXBURST1 preconfigured setting. Processing then continues by looping back to element 400 as above.

Those of ordinary skill in the art will readily recognize numerous equivalent techniques for improved interpretation of updated receive flow control information.

While the invention has been illustrated and described in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for transmission flow control in high-speed serial data transmission element comprising the steps of:
    maintaining an available credits indicia associated with each port of a plurality of ports associated with said transmission element wherein the transmission element is operable to transmit packets to an identified port of the plurality of ports when allowed in accordance with the available credits indicia associated with said identified port;
    receiving port status information from a receiving element wherein said port status information is associated with said identified port;
    detecting changes in said port status information; and
    reducing said available credits indicia associated with said identified port in accordance with the detected changes, wherein the step of receiving is operable independent of any packet transmissions to said receiving element and wherein the step of receiving is operable asynchronously with respect to any packet transmissions to said receiving element.

2. The method of claim 1 wherein said transmission element is an SPI compliant transmission element.

3. The method of claim 2
wherein the step of detecting changes in said port status comprises detecting a change in the xSTAT[1:0] field from STARVING status to HUNGRY status, and
wherein the step of reducing available credits comprises the step of setting said available credits associated with said identified port to the lesser of the present value of said available credits and the MAXBURST2 parameter associated with said identified port.

4. The method of claim 2 wherein said transmission element is an SPI compliant transmission element, and
wherein the step of detecting changes in said port status comprises detecting a change in the xSTAT[1:0] field from STARVING status to SATISFIED status, and
wherein the step of reducing available credits comprises the step of setting said available credits associated with said identified port to zero.

5. A method for reception flow control a high-speed serial data receiving element comprising the steps of:
generating storage metric information regarding buffer memory associated with each port of multiple ports associated with said receiving element; and
transmitting updated port status information to a transmitting element associated with said port wherein said updated port status information is derived from said storage metric information and wherein the updated port status is transmitted independent of receipt of any transmitted packet from said transmitting element and wherein the updated port status is transmitted asynchronously with respect to receipt of any transmitted packet from said transmitting device.

6. The method of claim 5 further comprising the step of:
allocating dedicated buffer memory associated with said each port; and
allocating shared buffer memory common to all of said multiple ports.

7. The method of claim 6 wherein the step of generating comprises the step of:
counting the amount of said dedicated buffer memory used by said each port.

8. The method of claim 7 wherein the step of transmitting updated port status information further comprises the step of:
updating said updated port status information in accordance with the present count of said amount of dedicated buffer memory used by said each port.

9. The method of claim 7 wherein the step of generating comprises the steps of:
counting the amount of said shared buffer memory used by said each port; and
counting the amount of said dedicated buffer memory used by said each port.

10. The method of claim 9 wherein the step of transmitting updated port status information further comprises the step of:
updating said updated port status information in accordance with the present count of said amount of dedicated buffer memory used by said each port and in accordance with the present count of said amount of shared buffer memory used by said each port.

11. The method of claim 10 wherein said receiving element is an SPI compliant receiving element.

12. The method of claim 11 wherein the step of updating comprises the step of:
updating said port status information to a status value selected from the group consisting of SATISFIED, HUNGRY, and STARVED in accordance with the present count of said amount of dedicated buffer memory used by said each port and in accordance with the present count of said amount of shared buffer memory used by said each port.

13. The method of claim 6 wherein the step of generating comprises the step of:
counting the amount of said shared buffer memory used by said each port.

14. The method of claim 9 wherein the step of transmitting updated port status information further comprises the step of:
updating said updated port status information in accordance with the present count of said amount of shared buffer memory used by said each port.

15. In an SPI compliant serial communication system having a transmission element and a receiving element, a method comprising:
generating buffer memory storage metric information within said receiving element wherein said storage metric information indicates buffer memory utilization by each port of a plurality of ports;
generating, within said receiving element, port status information regarding said each port wherein said port status information includes flow control information;
transmitting said port status information to said transmission element wherein said port status information is transmitted as xSTAT[1:0] status fields for said each port; and
transmitting packets from said transmission element to said receiving element when permitted in accordance with said flow control information,
wherein said port status information is updated and transmitted to said transmission element asynchronously with respect to the transmission of said packets and wherein said port status information is transmitted to said transmission element independent of transmission of any packets.

16. The method of claim 15 further comprising the step of:
allocating dedicated buffer memory associated with said each port; and
allocating shared buffer memory common to all of said multiple ports.

17. The method of claim 16 wherein the step of generating said buffer memory storage metric information comprises the steps of:
counting the amount of said shared buffer memory used by said each port; and
counting the amount of said dedicated buffer memory used by said each port.

18. The method of claim 17 wherein the step of transmitting said port status information further comprises the step of:
updating said port status information in accordance with the present count of said amount of dedicated buffer memory used by said each port and in accordance with the present count of said amount of shared buffer memory used by said each port.

19. The method of claim 18 wherein the step of updating comprises the step of:
updating said port status information as an xSTAT[1:0] status value selected from the group consisting of SATISFIED, HUNGRY, and STARVED in accordance with the present count of said amount of dedicated buffer memory used by said each port and in accordance with the present count of said amount of shared buffer memory used by said each port.

20. The method of claim 15 wherein the step of transmitting packets further comprises the steps of:
- detecting, within said transmission element, a change in said port status information from STARVING status to HUNGRY status, and
- setting an available credits associated with said identified port to the lesser of the present value of said available credits and the MAXBURST2 parameter associated with said identified port.

21. The method of claim 15 wherein the step of transmitting packets further comprises the steps of:
- detecting, within said transmission element, a change in said port status information from STARVING status to SATISFIED status, and
- setting an available credits associated with said identified port to zero.

22. Apparatus in a transmitting element adapted to transmit to receiving elements having multiple ports, said apparatus comprising:
- flow control logic for generating flow control information for each port of said multiple ports wherein said flow control logic is responsive to flow control status received from receiving elements; and
- transmission means coupled to said flow control logic for transmitting packets to a port of said multiple ports when permitted in accordance with flow control information provided by said flow control logic,
- wherein said flow control logic includes an available credit count for said each port and wherein said available credit counter is adjusted in accordance with packets transmitted to a corresponding port of said multiple ports by said transmission means and wherein said available credit counter is also reduced asynchronously with respect transmissions of packets to said corresponding port and in response to transmissions to ports other than said corresponding port.

* * * * *